Feb. 19, 1963 G. TUKACS 3,077,700
METHOD AND MEANS FOR PROPAGATING STOLONIFEROUS
GRASSES AND THE LIKE
Filed Jan. 16, 1961
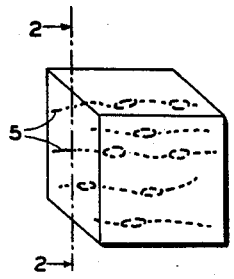
Fig. 1
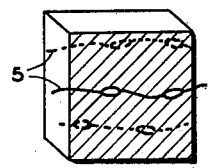
Fig. 2
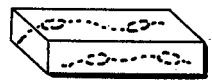
Fig. 3
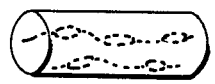
Fig. 4
Fig. 5
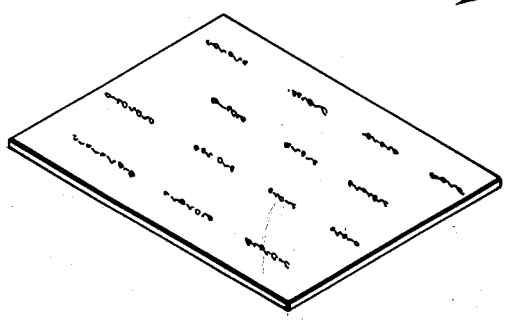
INVENTOR.
GEORGE TUKACS
BY
ATTORNEY.

United States Patent Office 3,077,700
Patented Feb. 19, 1963

3,077,700
METHOD AND MEANS FOR PROPAGATING STOLONIFEROUS GRASSES AND THE LIKE
George Tukacs, New Milford, Conn., assignor to Lawn Grass Pellets Company, Houston, Tex., a corporation of Delaware
Filed Jan. 16, 1961, Ser. No. 82,376
14 Claims. (Cl. 47—1)

This invention relates to an improved method and means for propagating grasses, particularly for asexually or vegetatively propagating stoloniferous grasses and the like by means of pelleted propagules.

This application is a continuation-in-part of my application Serial No. 12,245, filed March 2, 1960, now Patent No. 3,009,289. Almost all types of bent and creeping bent grasses, both lawn and feed grasses, such as Bermudas, creeping bents, centipede, buffalo grass, Napier, carpet, and St. Augustine grass, are currently propagated by means of sprigs or plugs or severed and/or cut-up stolons or similar asexually sproutable elements, which are simply transplanted. Transplanting methods involve not only the cutting of sod or plug units or of stolons or the like, but the digging of suitable cavities in the prepared earth for receiving the transplant. Such methods are so laborious, time-consuming and expensive, particularly if practiced on a large scale, as to be practically self-defeating. Moreover, sod and plug units carry a certain amount of dirt, which presents the additional problem of excessive weight and bulk, making transportation difficult and expensive, while frequently creating difficulties with the Bureau of Entomology and Plant Quarantine due to the possible presence of insects and fungal plant diseases carried by the soil.

The planting by sowing or scattering of chopped-up or cut stolons and rhizomes or like sproutable grass elements (propagules) has not proven practical, since they tend to dry out and die quickly and are easily blown away or picked up by a roller. In other words, viability in sowed pieces of stolons and the like is very low and retention of the sproutable grass parts in sod fragments is for the purpose of increasing their viability. A very large excess of sproutable parts has to be sown to insure a desired coverage. Moreover, it is necessary to cover the stolons with a thin layer of top soil, yet to leave at least end portions thereof exposed to the air to insure germination. The result is that previous efforts to vegetatively plant grass on a large scale have been expensive, inefficient and impractical.

Another serious disadvantage of previous methods of planting asexually propagated grasses is that their production and marketing necessarily have been severely limited, both in area and time. It has been necessary for golf courses and other large users of such grasses to maintain their own nearby nurseries to insure adequate supplies of sod. In short, it has been possible to market the propagating elements only in the immediate vicinity of the original growing area and very shortly after the actual cutting or digging of the plugs or other elements.

Another disadvantage of prior practice in asexually propagating grasses of the above type is that in order to obtain coverage of a maximum area, sprigs or plugs, usually, are planted eight to twelve inches apart as a matter of expediency, although it is known that closer planting results in more rapid filling in of the sod, and reduction of weed growth.

Still other disadvantages of prior hand planting practice are that the introduction of new plant varieties is impeded, the rate of planting is retarded due to selection of plants by workers, who must, therefore, have the requisite skill, and the freshly planted ground has an uneven or pocked appearance or characteristics of row planting.

Accordingly, an object of the present invention is to provide a novel, simplified, less expensive, faster, and easier method of asexually propagating grasses, particularly grasses propagated by means of stolons, rhizomes, rootstocks or the like.

Another object is to provide a novel method and means of planting or propagating stoloniferous grasses which is largely independent of local factors such as weather conditions and prevalence of plant diseases.

Another object is to provide a novel, simplified, yet entirely practical method and means for planting asexually propagated grasses on hard-to-hold embankments.

Another object is to eliminate the necessity for the planter to utilize time and skill in the selection of plants.

Another object is to provide means for planting grass stolons and the like which leaves a smooth ground surface.

Another object is to provide a novel method for vegetative or asexual propagation of grasses which permits the sproutable elements, such as stolons or rhizomes, to be widely distributed and to be marketed long after the units are actually cut.

Another object is to provide means for treating sproutable elements such as grass stolons and the like to materially improve the viability thereof.

Another object is to provide a carrier pellet of any shape for propagules (the grass stolons and other sproutable grass elements), which is relatively durable in handling, shipping, and sowing, which does not injure the propagules, but in fact, improves their viability, and which will readily and fairly rapidly disintegrate when exposed to weathering and moisture to free the incorporated elements for normal growth.

Still another object is to provide a thin plastic-like substitute for the one-foot square of natural sod now used, by cutting the propagule-laden mastic dough into squares preferably on the order of ¼ or ½ inch in thickness and 12 x 12 inches in area, thus creating a lightweight plastic sod, an entirely practical sod substitute with some grass edges exposed on top, easily shipped and without the many objections of regular sod such as insect and fungal disease carrying; and eliminating private nurseries at golf courses and the like.

According to my present invention, asexually sproutable elements such as stolons, rhizomes, rootstocks, and the like are cut or chopped into relatively short pieces of just sufficient length to insure the presence in each piece of one or more nodes or buds (propagules) dispersing the sproutable pieces in a mastic containing discrete, non-compacting substances, fertilizer and a binder, and if desired, coloring materials, spreading the mastic thinly upon a cutting, compressing and drying area, cutting the spread mastic into pellets of the desired shape and size, drying the pellets, then transferring the pellets to packages for shipment or to storage; or cutting up to foot squares for use as artificial sod, drying and shipping.

In the accompanying drawings, FIGS. 1, 2, 3 and 4 are perspective views of different forms of pellets. FIG. 2 is a section taken substantially on line 2—2 of FIG. 1.

FIG. 5 is a perspective view representative of an artificial sod piece in accordance with the invention.

The novel method consists, in general, in dispersing asexually sproutable grass elements or propagules (cut-up pieces of culm or of rhizomes) in a mastic containing non-compacting and humus-forming materials, which is then somewhat compressed and formed into pellets as by expression, through the thin silt or holes of a die plate, or by spreading and rolling on a suitable track, and cutting. Alternatively, the sproutable elements may be enclosed between two layers of mastic, as described below. The pellets are then dried and stored or shipped to the points of use. The dried pellets may be sowed by hand or by a seeding machine and then covered thinly with top soil, rolled, and watered.

The pellets may be of any shape or size and are made of various materials, as will be described in detail, largely organic, non-compacting, and non-injurious, which form a shell or carrier capable of protecting the enclosed, propagules (sproutable elements) during substantial storage and distribution periods and during sowing either by hand or by machine. The figures represent pellets of various shapes, that in FIG. 1 being cubical, that in FIG. 3 a broad, thin polygon, and that in FIG. 4, being cylindrical. In each case, the embedding or pelletizing material has substantially greater mass than the embedded stolons or the like so that the pellets have sufficient body to adequately protect the embedded elements to facilitate sowing, to resist dissipation by wind action, and to provide a favorable environment for sprouting. Each stolon piece has at least one surface, preferably a cut end, exposed on a surface of its pellet, as at 5 in FIGS. 1 and 2. In practice the pellets will assume the matter or packed appearance of their major ingredients and their edges will not be as smooth as they appear in the drawings. The particular sproutable elements, either stolons, rhizomes, root material, or other parts, in accordance with the particular species of grass and/or the season, are cut, cleaned, and isolated so that each individual piece may bear at least one or more nodes or buds. Stolons may be collected by cutting off the grass just above the ground surface; while rhizomes and root elements require first cutting off and casting aside the surface grass of the plants, then digging up the underground parts and washing, ready for shredding. During the preparation period, the sproutable parts should be maintained under humid conditions of relatively low temperature.

I preferably first form a dry mix containing the following ingredients in approximately the proportions noted:

Sphagnum or other peat moss _____quarts__ 10
Vermiculite (slightly heat-treated and exfoliated) _____quarts__ 10
Buckwheat hulls _____do____ 10
Fertilizer (commercial) _____pounds__ 2
Cold water corn starch (powdered, protein free, Amijel B-O11) _____pounds__ 6

The above dry ingredients are thoroughly mixed and the sproutable plant element, 16 quarts, are then added thereto and dispersed thoroughly therethrough by further mixing. A liquid mixture is then made up consisting of the following, substantially in the quantities noted:

Water, unheated _____quarts__ 14
Gelatine (raw, unsalted) _____ounces__ ½

The quantities given are adequate for 9,000 one-half inch cube pellets.

The peat moss, preferably Sphagnum moss, acts as a carrier for the fertilizer, supplies humus, and aids in controlling compaction, that is, provides porous or cellular structure and aeration of the pellet. I prefer to use a slightly heat-treated and slightly exfoliated vermiculite of a glistering color and in pieces about ⅛ inch in size. I have found that vermiculites sold under the trade names "Terralite" and "Zorballa" perform satisfactorily in the mixture. The vermiculite serves as an insulator, assists in controlling compaction and, therefore, aeration of the pellets, contributes to the weight and body of the pellets, and aids in the retention of the minimum quantity of moisture, as hereafter noted.

The buckwheat hulls also help in controlling compaction and aeration and provide cover for the carrier material much as they acted originally as a covering seed shell. I contemplate that other somewhat similar materials may be substituted therefor, such as cottonseed hulls, broken nut shells, or sawdust. While the peat moss, vermiculite, and buckwheat hulls or the like all contribute to compaction control and proper aeration of the pellets, each also serves its own function as noted. Nevertheless, it is contemplated that one or more of the mentioned ingredients for these purposes may be utilized or other similar discrete or fibrous, relatively insoluble, non-compacting and non-injurious materials may be utilized for the purpose.

Either organic or commercial fertilizer may be used in the mixture, in the latter case, a mixture having the commercial ingredient designation 7-7-7 has been found exemplary. Only readily soluble and available fertilizer is to be used; longer range fertilizer is not as satisfactory for this purpose. Small amounts of the fertilizer assist in the pregrowth of the sproutable elements.

Cold water, protein-free, powdered corn starch, which produces a smooth mix, is preferable. I have found that a corn starch sold commercially under the trade name of "Amijel B-O11" performs satisfactorily. The absence of protein results in the reduction of moulding tendency. The starch acts as a moisture soluble binder to stick together the other ingredients.

The water used should be unheated, that is at ambient temperature or even cooler, and only the minimum quantity used necessary to give the mixture a doughy consistency which will handle properly in the shaping and cutting operations. The water is mixed with raw, unsalted gelatine, and the solution is allowed to stand until it thickens. An organic coloring material may be added to the liquid ingredients if desired.

The dry ingredients may be processed in a suitable mixing machine or otherwise. The stolon pieces or other propagules, precut to a length at least slightly greater than the average internode distance, are added slowly to the agitated dry mix so as to be thoroughly dispersed therethrough. The liquid ingredients (gelatinized water) which have been allowed to thicken, are then added and the whole thoroughly mixed to form a homogeneous, doughy mastic. This mixture is then applied in a layer of the described thickness upon a suitable surface, as a table or floor. The mastic may be expressed through a die plate, as in a sausage machine or the like having holes of cylindrical, rectangular, or other shape. Such procedure somewhat compresses the material and also tends to align the embedded stolon pieces. Alternatively, the doughy mastic may be poured or shovelled upon the table or floor and spread out into a thin layer by application of a blade, rake, or shovel.

The layer or strips of mastic may then be cut to form pellets of the desired size and shape. If the cuts are judiciously spaced in relation to the node interval in the stolon pieces, each pellet will contain one or more such nodes and the ends of the stolon pieces will be exposed at the cut surfaces of the pellets. It is particularly important that substantially all sproutable elements have at least one end exposed to air at the surface of the pellet. The number of such elements contained in each pellet of a certain size and shape may be determined by control of the quantity of the elements dispersed through the mixture.

The size of the pellets may be determined by (1) the average length of the sproutable pieces, which is determined by the internode distance of each variety of grass, each pellet being at least slightly longer or wider than the node interval to insure the presence of at least one such node or bud in each pellet; (2) the length of time it is contemplated that the pellet must be preserved before planting, the thicker the pellet, the longer the period of viability, in general; (3) the extent of precutting of the sproutable elements into short length pieces; and (4) the number of pieces of sproutable material which are to be contained in each pellet, increasing this number having an important bearing upon the certainty of germination where relatively long internode pieces have to be cut short to assure the presence of one or more nodes in the smaller pellets.

The internode interval and, therefore, proper length of cut pieces may be readily determined by examination of the sproutable material which it is desired to use for propagation purposes. Experts in the field will understand whether it is necessary to incorporate in the pellets stolons, rhizomes, or other above or underground material. Thus, in propagation of coastal Bermuda and St. Augustine, particularly the common Texas variety with long internodes, and to some extent, the newer Georgia-Florida and coastal Bermuda varieties, pellets from ½ to ¾ inch in minimum dimension and from one and one-half to two inches long serve well, but smaller pellets may be used where the propagules are cut into shorter pieces.

It has been found, as an example, that a cylindrical pellet approximately ½ inch in diameter and length, or a cubical or prismatic pellet approximately ½ inch in minimum dimension will provide viability during a reasonable period of storage, while, obviously, requiring less pelletizing material than larger pellets and having materially less weight.

A flat, prism-shaped pellet, of course, has greater stability on the ground and, therefore, would be preferable for planting on hillsides. Where the grade is especially steep, a small quantity of a slightly sticky medium, such as asphalt, or other suitable mulch may be applied to the surface or mixed with the pellets. For this we suggest pellet prisms of ¼ x ⅜ x ¾ inch dimensions.

Another procedure for providing smaller pellets having longtime viability is as follows:

(1) Cut the grass culms with stolons, and/or root material containing rhizomes, either by hand or by suitable cutting machine, into pieces of suitable length to fit within the pellets and to assure the presence of one or more nodes for the pellet length agreed upon.

(2) Spread, as by means of a rake, a thin layer of the mastic dough, formed as heretofore described but without stolon pieces, on boards or trays conveniently, say, 4 feet wide by 6 feet long. On this layer spread a layer of the sproutable grass elements as by spraying or otherwise.

(3) Spread another layer of mastic dough on top of the stolon pieces.

(4) Roll with a heavy roller to reduce the total thickness of the mass to about ½ inch. The roller, if equal to the width of the boards or trays, would be rolled back and forth three times. This method assures good, protective cover for the sproutable grass elements so that viability will be maintained over a much longer period of time than if the whole were mixed together in one mix, as is suitable for larger, ¾ inch cubes.

(5) The ½ inch layer is then cut transversely and length-wise to form small cubical pellets of the required size, say ½ inch thick by ½ inch wide by ½ or ¾ inch long, or flat prisms ¼ inch by ⅜ inch by ¾ inch for use on embankments. Cutting of the mastic dough sheet may be done by (1) circular gangsaws suitably spaced, (2) by band saws suitably spaced, or (3) by means of blades or dies having sharpened steel edges set the proper distance apart. In the latter case, the blades or dies are forced into the mastic sheet or strips with sufficient pressure to make the cut at a single stroke. The use of the Amijel corn starch permits a clean, non-sticking cut on wood or metal.

(6) Place loaded boards or trays in a stack-truck for transportation to a drying room.

(7) Expose the stacked pellets to drying fans to reduce the moisture to a maximum of 10%.

(8) Remove the pellets from the boards or trays after drying, or store on the boards or trays under refrigeration.

The completed pellets will be sufficiently form-sustaining and dry to withstand handling incident to storage, shipping, and planting either by hand or machine sowing.

The pellets may be preserved for several months by storage in a refrigerator maintained at from 40° to 50° F.; or they may be preserved for shorter periods in thin layers of dry sand or in a lighted place to prevent premature sprouting.

In propagating grass by means of the propagule-bearing pellets, the pellets are distributed over the ground surface, previously prepared as by scratching, raking and fertilization, at the desired density, say 4 or 8 inches apart, depending upon the rapidity of coverage desired. The ground may then be rolled and watered to insure intimate contact of the sproutable elements therewith. The contents of the pellets serve to form nutritional and highly compatible local environments for the sproutable pieces, furnishing humus, aeration, and fertilizer or the like to aid in germination thereof. We have found that 90 to 95% germination may be expected from grass propagation as explained above.

An extension of the idea of using pellets offers an improved way of sodding (useful for sport fields, air fields, golf course teeing areas, parks and roadside embankments). A mastic dough, as described above, is compressed to ¼ inch thickness, and a layer of propagules is applied to the top thereof. This dough with embedded stolons is cut into one-foot square slabs (FIG. 5) and dried and then may be planted or laid in the manner of ordinary sod. The slabs require about the same amount of grass elements as a four inch pellet spread, but the grass pieces need not be cut as short. This product has advantages over ordinary sod of avoiding legal difficulties in some states where soil from other states (because of insect, fungi and disease-carrying elements) is not importable, and of very substantially reducing the cost of transportation due to the light weight of ¼ inch synthetic or reconstituted sod squares (about 1.8 lb. each).

The packaging either of the pellets or the artificial sod slabs, may be accomplished in perforated, corrugated board boxes or in bushel or half-bushel baskets which should be properly covered for shipment. It is intended that the pellets or sod pieces contain the proper asexually or vegetatively sproutable elements of the particular grass, and the term "propagules, or stolons or stolons and the like" as used in this specification and in the claims is intended to refer to the asexually sproutable elements, in general.

The exclusive use of all modifications as come within the scope of the appended claims is contemplated.

I claim:

1. In the vegetative propagation of stoloniferous grass, the step of adding stolons and/or like sproutable elements of the grass to a mastic containing peat moss, slightly heat-treated vermiculite, a discrete organic substance of the group consisting of vegetable hulls, saw dust and broken nut shells, starch, gelatine, and moisture.

2. In vegetative propagation of grass, the steps of adding grass stolons or the like to a dough mastic containing peat moss, slightly heat-treated vermiculite, one or more of the organic discrete substances of the group consisting of vegetable hulls, saw dust, and broken nut shells, starch, raw gelatine, and water, applying the mixture thinly upon a surface, drying the mixture, and cutting the mixture into discrete bodies.

3. The method specified in claim 2 in which the dough mastic with embedded stolons or the like is pressed through a die plate in being applied to the drying surface.

4. In the propagation of stoloniferous grass, forming a dry mix containing peat moss, exfoliated vermiculite, vegetable hulls, fertilizer, and protein-free, cold-water starch, slowly mixing grass stolons or the like with said dry mix, forming a liquid mix containing raw, unsalted gelatine and unheated water, mixing together the dry and liquid mixes to form a doughy mastic, laying the mastic thinly upon a surface, cutting the mastic into discreet bodies, and drying the bodies.

5. In the propagation of stoloniferous grass, forming a dry mix containing peat moss, exfoliated vermiculite, vegetable hulls, fertilizer, and protein-free, cold-water starch, mixing said dry mix with gelatinized, unheated water to form a doughy mastic, spreading a thin layer of said mastic on a surface, evenly applying an adequate amount of pre-cut stolons and the like completely upon said layer, spreading a second layer of said mastic on top of said stolons, rolling the entire mass with a heavy roller so as to compress the same to the desired thickness, cutting the mastic into discrete bodies, and drying the bodies.

6. A discrete, form-sustaining body for use in vegetative propagation of grass containing ingredients in the following approximate proportions:

| | | |
|---|---|---|
| Raw unsalted gelatine | ounces | ½ |
| Water, unheated | quarts | 10 |
| Sphagnum peat moss | do | 10 |
| Hulls | do | 10 |
| Fertilizer | pounds | 2 |
| Starch, protein-free, powdered | do | 6 |
| Grass stolons or the like | quarts | 16 |

7. A pellet for vegetative propagation of grass comprising substantial proportions of peat moss, slightly exfoliated vermiculite, and vegetable hulls, lesser quantities of starch, raw gelatine, and fertilizer, one or more grass propagules, substantially all with one or more of their ends exposed on the surface of the pellet, and a slight amount of moisture so that the pellet is dry to the touch and form sustaining, yet porous.

8. Artificial sod for use in propagating grass comprising a form-sustaining body having as major ingredients peat moss, exfoliated vermiculite, and vegetable hulls, lesser quantities of starch, raw gelatine, and moisture, and grass propagules added thereto.

9. In the propagating of stoloniferous grass, the steps of mixing grass propagules in a doughy mastic, expressing said mastic through an orifice into a strip or layer, and cutting said strip or layer at intervals at least slightly greater than a multiple of the internode intervals of said propagules with end portions exposed on the surface of the pellets.

10. A pellet for use in propagating stoloniferous grass and the like comprising one or more propagules of the grass and a form-sustaining carrier of materials readily disintegratable under weathering conditions, said carrier having a mass substantially greater than the mass of the carried propagule material, and having a sticky coating to resist dislodgement of the pellet from an earth surface against which it is laid.

11. In the vegetative propagation of stoloniferous grass, the steps of forming a doughy mastic containing peat moss, vermiculite, vegetable hulls, a binder, and moisture which upon setting forms a cohesive mass and which will disintegrate upon exposure to moisture and/or weathering, adding grass propagules to said mastic, forming the mastic into separate bodies, a surface of each embedded propagule being exposed on the surface of the embedding body, each resultant body having a mass substantially greater than that of the contained propagules, and drying.

12. A cohesive, form-sustaining body for use in propagating stoloniferous grasses comprising a carrier having as major ingredients peat moss, vermiculite, and a discrete, organic substance of the group consisting of vegetable hulls, sawdust, and broken nut shells, a binder, and water, and also containing grass propagule material, the mass of said carrier material being substantially greater than that of the contained propagule material.

13. In the propagation of stoloniferous grass, forming a doughy mastic containing peat moss, vermiculite, and moisture, spreading the mastic thinly upon a surface, dispersing grass propagules on said surface, spreading a second layer of the mastic upon said first layer and said propagules, cutting said layers into discrete bodies, each containing at least one of said stolons or the like, and drying.

14. The method described in claim 13 including the further step of compressing said layers for causing close adherence thereof about said stolons or the like.

References Cited in the file of this patent

UNITED STATES PATENTS

| | | |
|---|---|---|
| 1,486,431 | Harvey | Mar. 11, 1924 |
| 2,083,065 | Heyl | June 8, 1937 |
| 2,235,950 | St. John | Mar. 25, 1941 |
| 2,579,734 | Burgesser | Dec. 25, 1951 |

FOREIGN PATENTS

| | | |
|---|---|---|
| 522,525 | Germany | Apr. 10, 1931 |
| 641,280 | Great Britain | Aug. 9, 1950 |
| 741,378 | Great Britain | Nov. 30, 1955 |

OTHER REFERENCES

New York Times (newspaper), Sunday, Feb. 12, 1950, Section 2, page 24X, columns 1 and 2, article, "Seeds With Jackets," by F. C. Coulter. Copy is in Division 1 at 47—Seed Treatment.

"The Complete Garden Handbook" (Simon et al.), published by Van Nostrand (N.Y.), 1950. Page 234 relied on. Copy in Division 1.